Dec. 28, 1965   J. A. PAGE   3,225,715
APPARATUS FOR PRODUCING ROLL-IN TYPE DOUGHS
Filed March 19, 1962   3 Sheets-Sheet 1
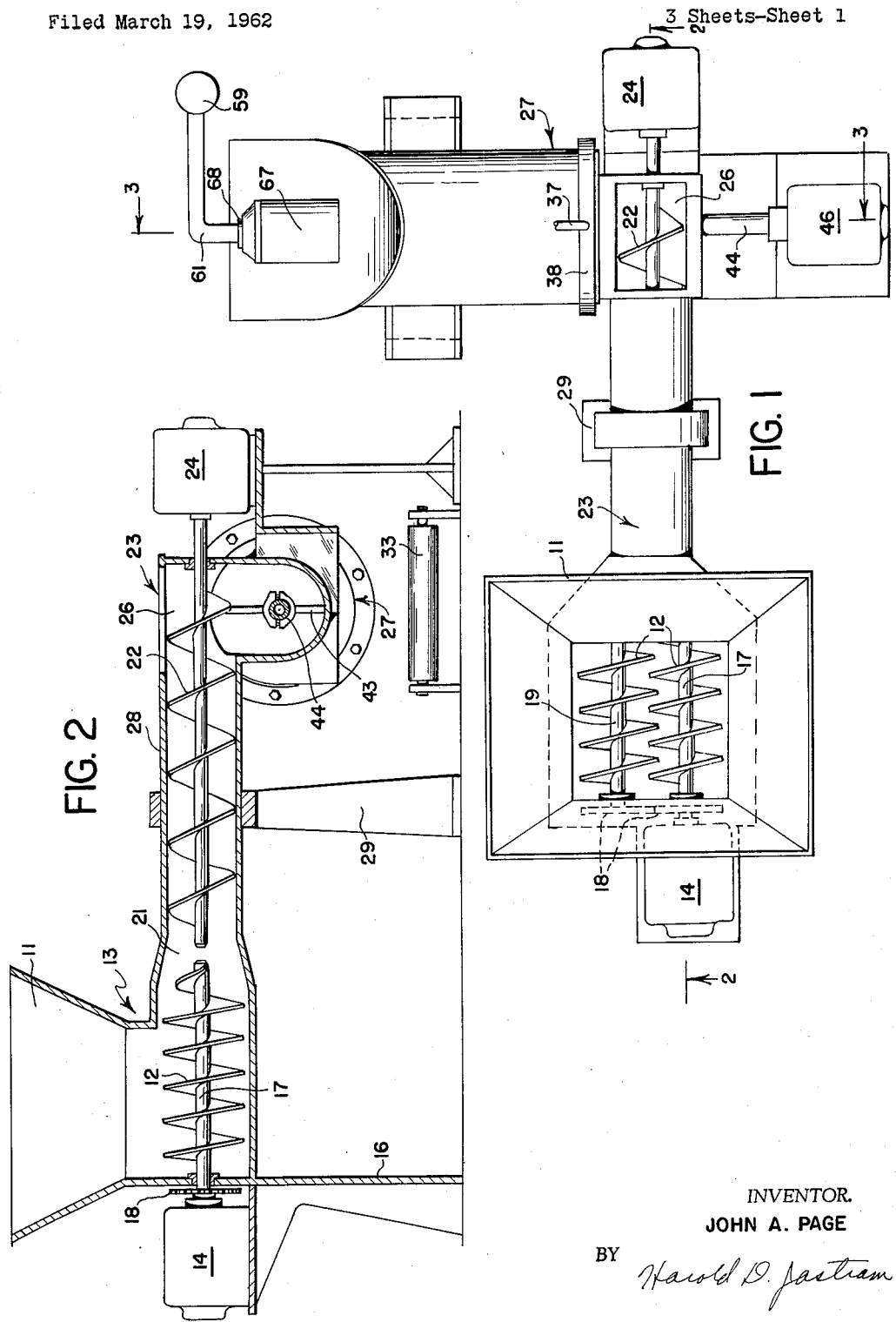
INVENTOR.
JOHN A. PAGE
BY
Harold D. Jastram
ATTORNEY Dec. 28, 1965  J. A. PAGE  3,225,715
APPARATUS FOR PRODUCING ROLL-IN TYPE DOUGHS
Filed March 19, 1962  3 Sheets-Sheet 2
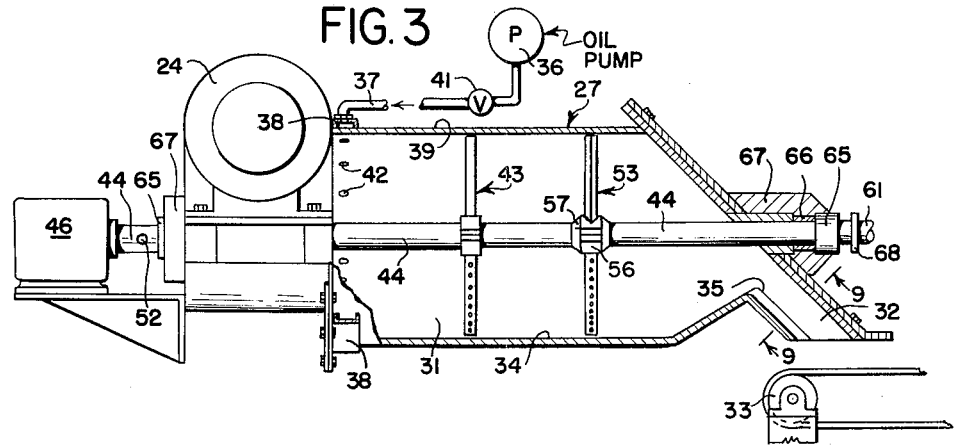
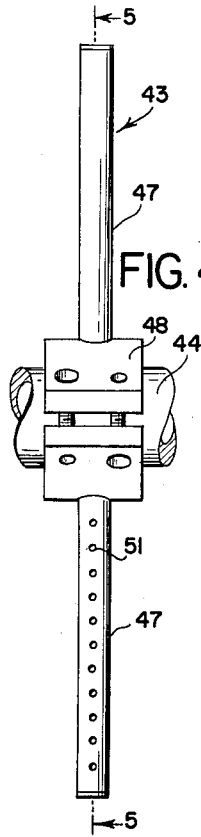
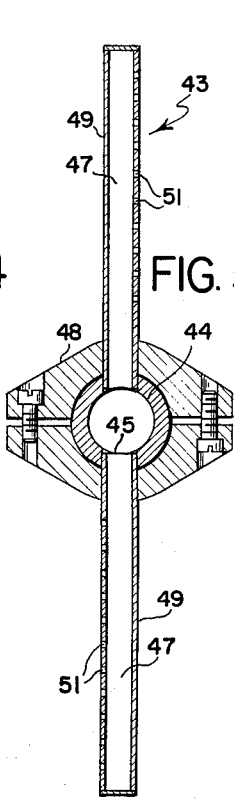
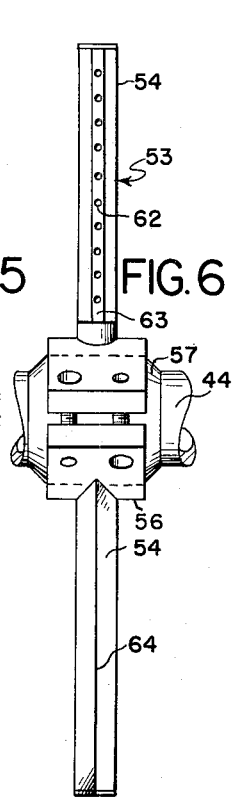
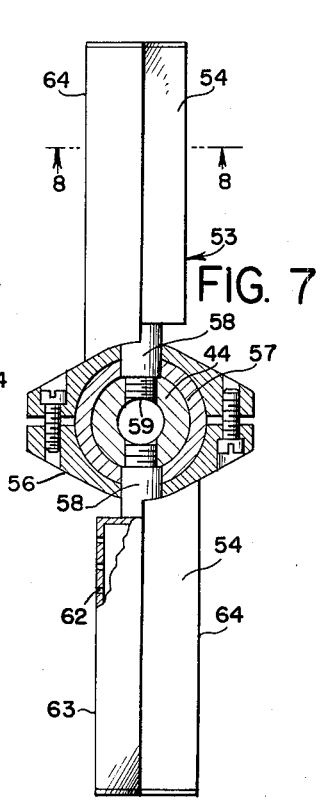
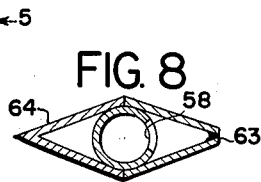
INVENTOR.
JOHN A. PAGE
BY Harold D. Jastram
ATTORNEY Dec. 28, 1965   J. A. PAGE   3,225,715
APPARATUS FOR PRODUCING ROLL-IN TYPE DOUGHS
Filed March 19, 1962   3 Sheets-Sheet 3
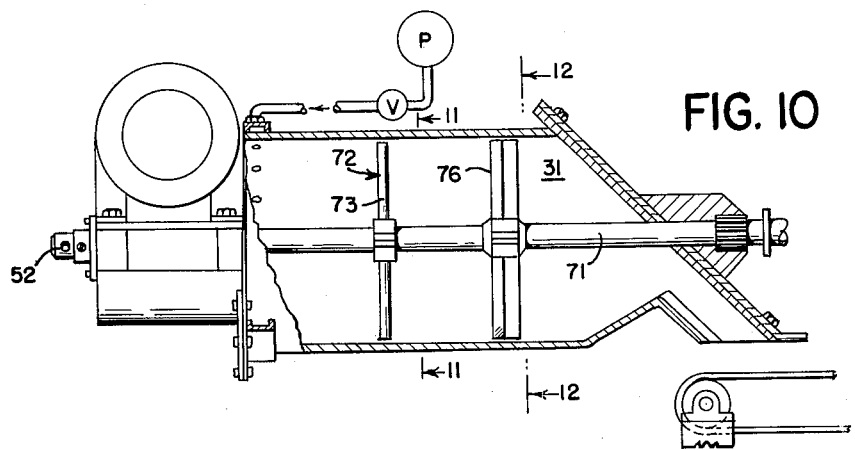
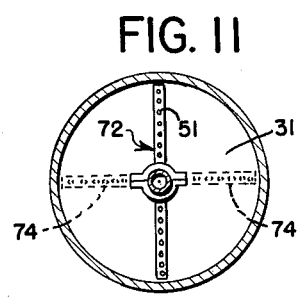
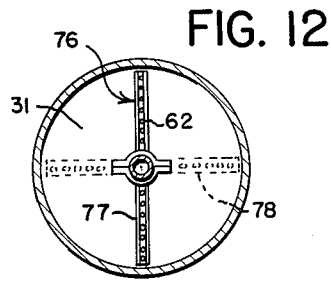
INVENTOR.
JOHN A. PAGE
BY *Harold D. Jastram*
ATTORNEY

United States Patent Office 3,225,715
Patented Dec. 28, 1965

3,225,715
APPARATUS FOR PRODUCING ROLL-IN TYPE DOUGHS
John A. Page, Minneapolis, Minn., assignor to General Mills, Inc., a corporation of Delaware
Filed Mar. 19, 1962, Ser. No. 180,614
7 Claims. (Cl. 107—30)

This invention relates to apparatus for processing food products and more particularly to apparatus for producing roll-in type pastry dough products such as Danish pastry.

Heretofore it has been the commercial practice to make roll-in pastry dough products, such as Danish pastry, by rolling pastry dough into a sheet having a predetermined length, width, and thickness. Fatty material, such as pastry margarine or shortening, is then placed over a portion of a surface of the rolled dough. The portion of the dough which is not covered with the fatty material is then folded over the portion covered with shortening. This folding process is repeated to form several layers of dough separated by layers of fatty material. The folded dough with intermixed layers of fatty material is then rolled out to approximately its original size so that the layers of dough are separated by thin continuous layers of fatty material. The folding and rolling processes are repeated, without adding additional fatty material, until many layers of dough separated by layers of fatty material are produced with the result that a desired flaky texture in the final product is obtained. In some instances chilled cubes of fatty material are placed on the layers of dough at the end of the dough mixing operation. The cubes are dispersed throughout the dough thus forming a heterogeneous mixture when the dough is repeatedly folded.

The above processes which involve a number of folding and rolling steps require much time and require a great deal of manual labor which greatly increases the cost of the finished product.

It is therefore an object of the present invention to provide a new and improved apparatus for processing food products.

It is another object of the present invention to provide a new and improved apparatus for producing pastry dough products.

Another object of the present invention is to provide an apparatus for applying fluid material to roll-in type pastry dough products to distribute the material throughout the dough to produce a heterogeneous mixture of material and dough.

A still further object of the present invention is to provide an apparatus for applying fatty material used in the manufacture of roll-in pastry dough products, which apparatus greatly decreases the amount of manual labor required in making roll-in type pastry dough products.

Another object of the present invention is to provide an apparatus which discharges a fluid such as air trapped in pastry doughs to prevent the dough from taking on a ragged appearance.

Another object of the present invention is to provide an apparatus which uniformly applies fatty material, in plastic form, to roll-in pastry dough products to insure flakiness of the cooked dough product.

Another object of the present invention is to provide an apparatus which utilizes the elastic characteristic of food product dough to facilitate removal of air trapped in the dough.

A further object of the present invention is to provide an apparatus which uniformly extrudes a layer of pastry dough having intermixed fatty material which will result in a flaky cooked product.

An apparatus according to the present invention for producing roll-in type pastry dough may include an extruder which forms a uniform sheet of dough. Raw dough is introduced into a dough pump through a hopper. The dough is conveyed from the hopper to a chamber in the extruder by a screw conveyor. The dough is forced into and through the chamber due to the pressure developed by the conveyor. An air vent is positioned in the chamber and is rotated so that air pockets formed in the dough are exhausted as the dough is forced past the rotating air vent toward the mouth of the extruder. A second device is rotated through the dough in the extruder chamber and distributes fatty material throughout the dough as it moves from the chamber into the constricted mouth of the extruder where the dough is discharged in a uniform layer of a substantially rectangular cross section.

A complete understanding of the invention may be obtained from the following detailed description of an apparatus forming a specific embodiment when read in conjunction with the appended drawings in which:

FIGURE 1 is a plan view of an apparatus for producing roll-in type dough showing a dough auger, dough pump, and extruder;

FIGURE 2 is a cross sectional view taken along line 2—2 of FIGURE 1 showing the auger, the working flights of the dough pump, and the rear of the extruder chamber;

FIGURE 3 is a partial section view of the extruder chamber shown in FIGURE 1;

FIGURE 4 is a side view of an air vent illustrated in FIGURE 3;

FIGURE 5 is a section view taken along line 5—5 of FIGURE 4 showing the air path in the air vent of FIGURE 4;

FIGURE 6 is a side view of a shortening dispenser illustrated in FIGURE 3;

FIGURE 7 is a side view partially in cross section of the dispenser shown in FIGURE 6;

FIGURE 8 is a cross section taken along line 8—8 of FIGURE 7 showing the shape of radially extending arms illustrated in FIGURE 7;

FIGURE 9 is a cross section taken along line 9—9 of FIGURE 3 showing the shape of the extruder opening;

FIGURE 10 is a partial section view of an alternate embodiment of the extruder shown in FIGURE 3;

FIGURE 11 is a section view taken along line 11—11 of FIGURE 10, and

FIGURE 12 is a section view taken along line 12—12 of FIGURE 10.

Refer first to FIGURE 1. Pastry dough which is being processed to produce Danish pastries is introduced into hopper opening 11 and is forced into the helical flights 12 of auger 13. Helical auger flights 12 are driven by motor 14 which is mounted on frame 16. Motor 14 is directly connected to shaft 17 and is connected through gears 18 to drive shaft 19. Helical flights 12 are intermeshed in order that the self cleaning feature of the intermeshed flights can be utilized to remove all the dough from auger 13. The cooperating pair of helical flights 12 also develop a greater pressure head on the dough for forcing it into dough pump 23.

Dough which is fed into hopper 11 engages helical flights 12 and is driven into a constricted zone 21 of auger 13 where it engages helical flights 22 of dough pump 23. Motor 24 drives the helical flights 22 of pump 23 so that dough from zone 21 engages helical flights 22 and is moved the length of the dough pump 23 where it is deposited in reservoir 26 of extruder 27. The housing 28 of pump 23 is supported on frame member 29. A standard auger arrangement has been illustrated for pump 23; however, pump 23 should be selected so that it will satisfactorily move a particular dough product with the minimum of slippage.

The pressure developed by the helical flights 22 acting on the pastry dough, forces the dough into reservoir 26 and then into chamber 31 of extruder 27 (see FIGURE 3). The dough fills the entire chamber 31 and due to the pressure developed on the dough in the chamber, is forced to the discharge opening 32 of the extruder 27 where it is deposited in a rectangular cross section on conveyor 33. Experience has demonstrated that a sheet of dough with a rectangular cross section is produced if a shaped plate 35 is used to form an opening 32 having a cross section as shown in FIGURE 9. Dough has a tendency to flow faster, due to less resistance, at the center of the opening than at the sides, so the plate 35 is used to restrict the central portion of opening 32 to insure that the sheet of dough produced is of a rectangular cross section. Conveyor 33 carries the dough to a subsequent processing station.

Since pastry dough often has a tendency to adhere to the surface of extruder chambers such as chamber 31, provision is made to prevent adherence to chamber wall 34 of extruder 27. These provisions help prevent the dough from having a ragged appearance after it has been extruded through opening 32 and onto conveyor 33. An oil pump 36 pumps vegetable oil or some similar lubricant throught conduit 37 and into manifold 38 which surrounds the outer wall 39 of chamber 31. Valve 41 controls the flow of the vegetable oil so that it is dispensed through apertures 42 at a predetermined rate. The vegetable oil lubricates the surface of chamber wall 34 so that the dough which enters chamber 31 from reservoir 26 moves along walls 34 with a minimum of resistance and thus the dough does not develop a ragged appearance when it is extruded onto the conveyor 33. This lubricating feature may not be needed in the case where the volume of the chamber 31 is large in relation to its wall surface, since in that case, the resulting raggedness is not objectionable.

When various batches of pastry dough are introduced into hopper 11, air pockets form between the batches. Additional air or fluid pockets are introduced into the dough by auger 13 and dough pump 23 as the dough is moved from the hopper 11 to the reservoir 26. These air pockets, if not removed, produce a relatively unsatisfactory product since they burst as the dough is extruded from the chamber where the dough is under pressure. A rotary air vent 43 is mounted in chamber 31 for the purpose of agitating the pastry dough as it is forced from reservoir 26 through chamber 31 to the discharge opening 32. Arms 47 are mounted on a hollow drive shaft 44 which is connected to motor 46. The arms 47 of vent 43 extend radially from drive shaft 44 where they are inserted in drive shaft 44 in an opening 45. The arms 47 (see FIGURES 4 and 5) are clamped to drive shaft 44 by clamps 48 or some other suitable device.

Motor 46 rotates shaft 44 so that the leading edge 49 of arms 47 engages and agitates the pastry dough as it is moved past vent 43. When arms 47 engage an air pocket in the pastry dough, the air travels through apertures 51 through the hollow body of arms 47 and into hollow drive shaft 44. Air vent 43 takes advantage of the elastic qualities of the dough to discharge the air in the air pocket. As the vent 43 moves through the dough, the dough is stretched out, breaks and springs back to its original shape, consequently the apertures 51 remain free of dough. This characteristic is also utilized in connection with the shortening dispenser 53. When the vent 43 passes through an air pocket, the air escapes through apertures 51. No vacuum is necessary to remove the air in the pocket, since the air is under pressure due to the elastic characteristic of the dough and also because the dough is under pressure in the extruder chamber 31. The discharged air moves through hollow drive shaft 44 and is discharged to the atmosphere through apertures 52 (see FIGURE 3). The vent 43 thus agitates the pastry dough and removes undesirable air pockets in the dough prior to extrusion of the dough onto the conveyor 33.

Danish pastries acquire a flaky characteristic as a result of layers of shortening which are used to separated layers of pastry dough. When the proper intermixing of layers is accomplished, the final cooked product takes on a flaky characteristic only if the shortening has been properly intermixed with the layers of dough. Shortening dispenser 53 is mounted in chamber 31 for the purpose of providing spiral layers of shortening in the pastry dough in order that the final extruded dough sheet can be processed and cooked to produce the flaky characteristic normally present in Danish pastries.

Radially extending arms 54 of dispenser 53 are mounted on hollow drive shaft 44 by a clamp 56 which in turn is mounted on a ring 57. Each arm 54 contains a hollow tube 58 which is threaded into apertures 59 of drive shaft 44. Shortening is pumped from source 59 (see FIGURE 1) through conduit 61 and into hollow drive shaft 44. The shortening which is actually in a plastic or very viscous form travels through the drive shaft 44 into tubes 58 and out through nozzles or apertures 62 which are located along the trailing edge 63 of arms 54. Apertures 62 are not closed by dough due to the elastic characteristic as explained in connection with air vent 43. As the motor 46 turns drive shaft 44, leading edges 64 of arms 54 cut through the pastry dough. Shortening is deposited in a series of spiral layers from apertures 62 in the pastry dough so that the resulting mixture includes many layers of dough separated by many layers of shortening. The extruded dough when cooked thus results in a Danish pastry product with a desirable flaky characteristic.

Shaft 44 is mounted on nylon bushings 66 at either end of extruder 27 which serve as seals. The nylon bushings are mounted in housing 67. The housing at the left end of the apparatus (see FIGURE 3) is not shown in cross section since it is exactly the same as the bearing arrangement illustrated at the right end or head end of the extruder 27. The shaft 44 is supported at either end by conventional ball bearings 65. Plastic shortening is fed into drive shaft 44 from conduit 61 and the drive shaft 44 is movably coupled to conduit 61 by a rotary coupling 68 which forms a movable seal between drive shaft 44 and conduit 61. None of the shortening fed into shaft 44 emerges from apertures 51 from air vent 43. The oil passage in shaft 44 does not communicate with air vent 43. Shaft 44 is solid in the section between air vent 43 and dispenser 53. The respective passages in the shaft to the air vent 43 and the dispenser 53 extend a small distance beyond the air vent 43 and dispenser 53 as noted in FIGURES 4 and 6.

The pastry dough thus moves at a predetermined rate as determined by the speed of rotation of the dough pump, into reservoir 26, and then into chamber 31. Air pockets which have developed in the dough are removed in the chamber 31 by air vent 43 as the dough moves past the vent. The dough which has been lubricated by vegetable oil flowing through apertures 42 then engages shortening dispenser 53 which is rotated by motor 46 and shaft 44 so that a number of spiral layers of shortening are dispensed in the dough before it is forced into the discharge opening 32 of the extruder 27. The extruder opening 32 produces a sheet of dough which is carried away from the extruder opening 32 by conveyor 33 to a subsequent processing station. It is possible to use the extruder 27 with stationary air vents and shortening dispensers; however the rotary type described in detail gives very satisfactory results and is practical in actual practice. If stationary air vents and shortening dispensers were used the trailing edges of the respective parts would need to be turned 90° so that dough would not enter the apertures 51 and 62 as it flows the length of the chamber 31 past the vents and dispensers. An example of such an arrangement is illustrated in FIGURES 10, 11 and 12 of the drawings. Shaft 71 is stationary in this embodiment. In other respects, shaft 71 functions like shaft 44. The shaft is hollow to permit discharge of entrapped air through air vent 72. Air vent 72 is constructed the same as vent 43 except that the arms 73 are rotated 90° so that the apertures 51 face the discharge end of the chamber 31. (See FIGURE 11.) Arms 74 which illustrate additional stationary vents can be used depending on the needs of the operation.

Shortening dispenser 76 is mounted on shaft 71 in the same manner as dispenser 53 and is the same as dispenser 53 except that the arms 77 are rotated 90° so that the apertures 62 face the discharge end of the chamber 31. (See FIGURE 12.) Stationary dispenser 76 functions like dispenser 53 except that dispenser 76 does not rotate to dispense shortening. The shortening is dispensed as the dough moves past the dispenser 76 toward the discharge opening. Arms 78 illustrate that more than one shortening dispenser may be mounted in the chamber 31.

It is to be understood that the above described arrangements are simply illustrative of the application of the principles of the invention. Numerous other arrangements may be readily devised by those skilled in the art which will embody the principles of the invention and fall within the spirit and scope thereof.

Now therefore I claim:

1. An apparatus for processing pastry dough which comprises an extruder having a chamber and a discharge opening, a dough pump for forcing dough through said chamber and out said opening at a predetermined rate, a rotary air vent having discharge openings in radially extending arms mounted within said chamber, a rotary shortening dispenser having nozzzles in radially extending arms mounted within said chamber, and means for driving said vent and dispenser.

2. An apparatus in accordance with claim 1 which further includes means including apertures in the walls of said chamber for lubricating the walls of said chamber and in which said dough pump is a screw type conveyor.

3. An apparatus in accordance with claim 1 in which said extruder has a discharge opening of rectangular cross section for extruding a sheet of dough.

4. An apparatus in accordance with claim 1 in which the openings in said vent are on trailing surfaces of said arms and in which said nozzles are on trailing surfaces of said dispenser arms.

5. An apparatus for processing pastry dough which comprises a dough extruder having a chamber and an outlet, means for forcing dough through said chamber to the outlet of said extruder, a shortening dispenser mounted in said chamber and having a series of nozzles for distributing shortening in said dough, means for moving said dispenser to distribute said shortening, and means mounted in said chamber for agitating said dough and having a series of apertures to discharge air entrapped in said dough.

6. An apparatus for processing pastry dough which comprises a dough extruder having a chamber and an outlet, means for exerting pressure on the dough to compress the dough and force the dough through said chamber to the outlet of said extruder, a shortening dispenser mounted in said chamber and having a series of nozzles for distributing shortening in said dough, means for moving said dispenser to distribute said shortening, and means mounted in said chamber for agitating said dough and having a series of apertures communicating with the ambient atmosphere to discharge air which is entrapped under pressure in said dough.

7. An apparatus for processing pastry dough which comprises a dough extruder having a chamber and an outlet, means for forcing dough through said chamber to the outlet of said extruder, a shortening dispenser mounted in said chamber and having a series of nozzles for distributing shortening in said dough, and means mounted in said chamber for agitating said dough as said dough moves through said chamber and having a series of apertures communicating with the ambient atmosphere to discharge air which is entrapped under pressure in said dough.

References Cited by the Examiner
UNITED STATES PATENTS

| | | | |
|---|---|---|---|
| 1,700,510 | 1/1929 | Oches | 107—30 |
| 1,704,903 | 3/1929 | Russell | 107—7.1 X |
| 2,640,033 | 5/1953 | Marshall | 107—31 X |

WALTER A. SCHEEL, *Primary Examiner.*

CHARLES A. WILLMUTH, ROBERT E. PULFREY,
*Examiners.*